Jan. 1, 1929.
W. F. SPREITER
VEHICLE WINDOW SCREEN
Filed April 30, 1928    3 Sheets-Sheet 1
1,697,092
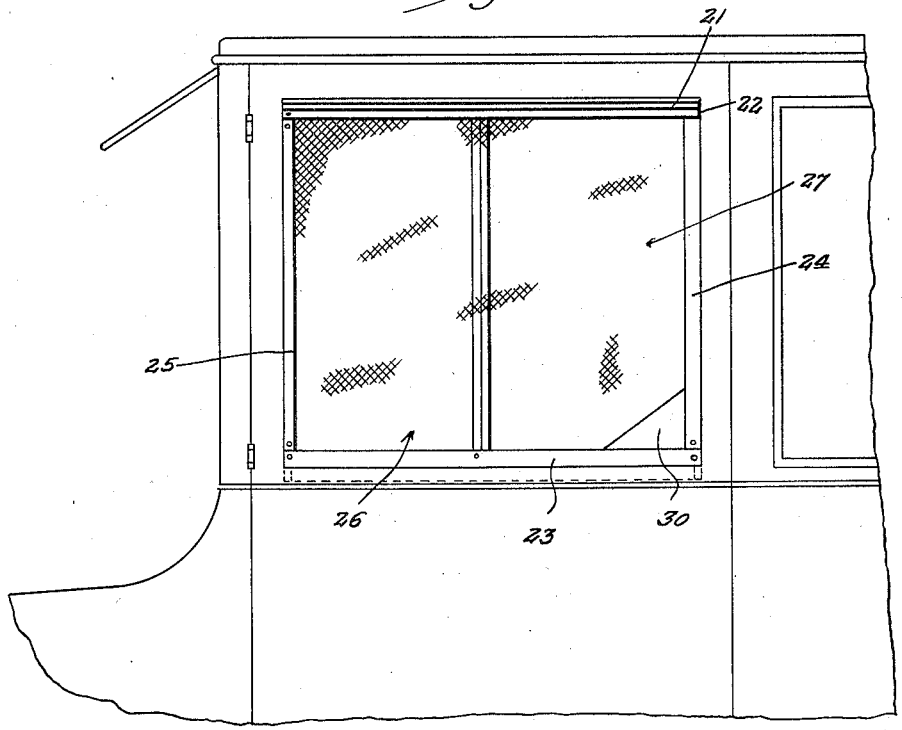
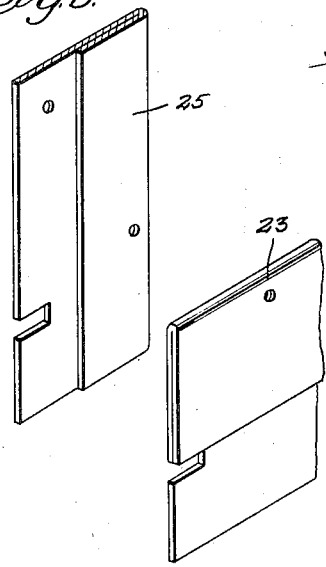
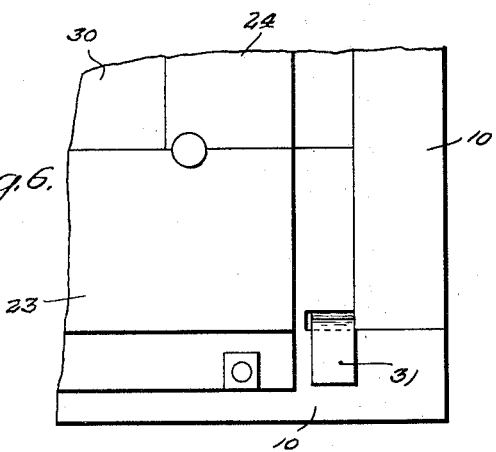
Inventor
W. F. Spreiter,
By *Clarence A. O'Brien*
Attorney Jan. 1, 1929.
W. F. SPREITER
VEHICLE WINDOW SCREEN
Filed April 30, 1928  3 Sheets-Sheet 2
1,697,092
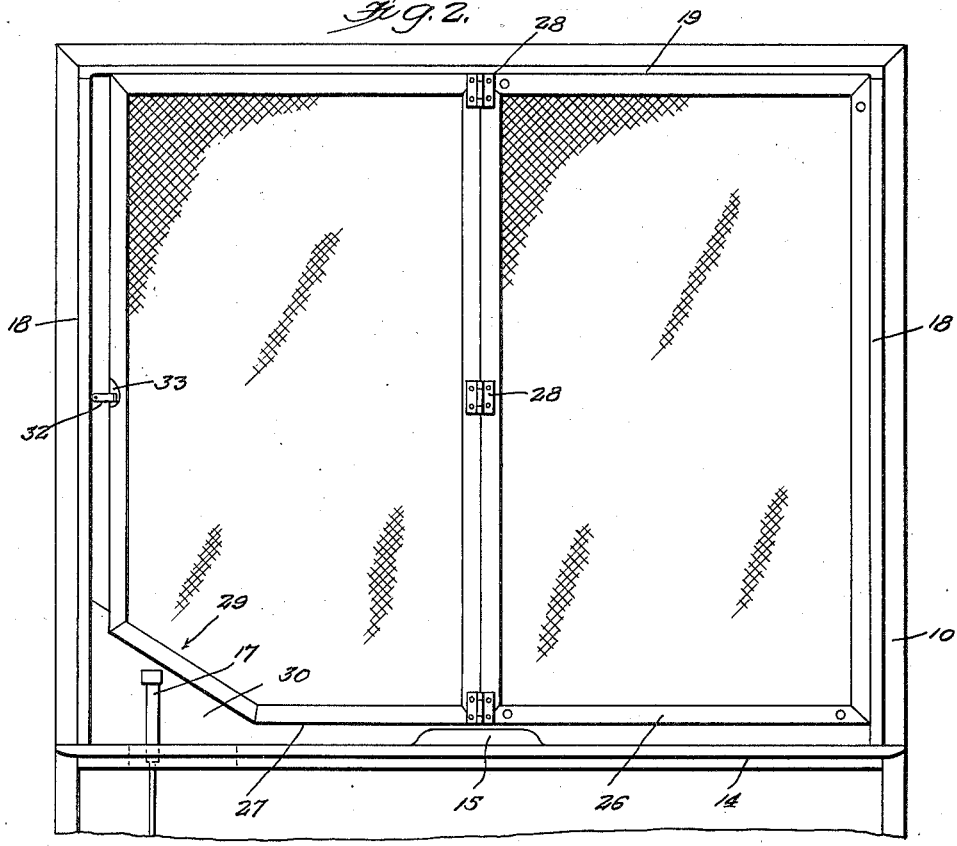
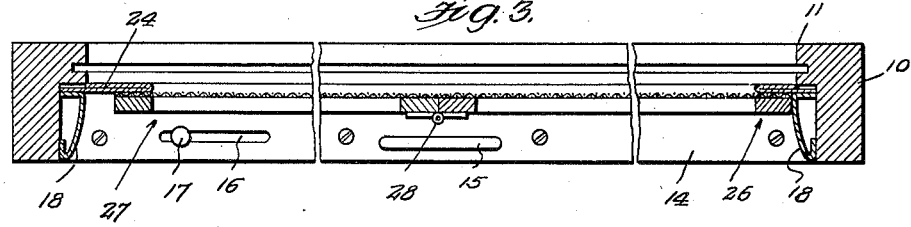
Inventor
W. F. Spreiter,
By *Clarence A. O'Brien*
Attorney Jan. 1, 1929.  
W. F. SPREITER  
1,697,092  
VEHICLE WINDOW SCREEN  
Filed April 30, 1928   3 Sheets-Sheet 3
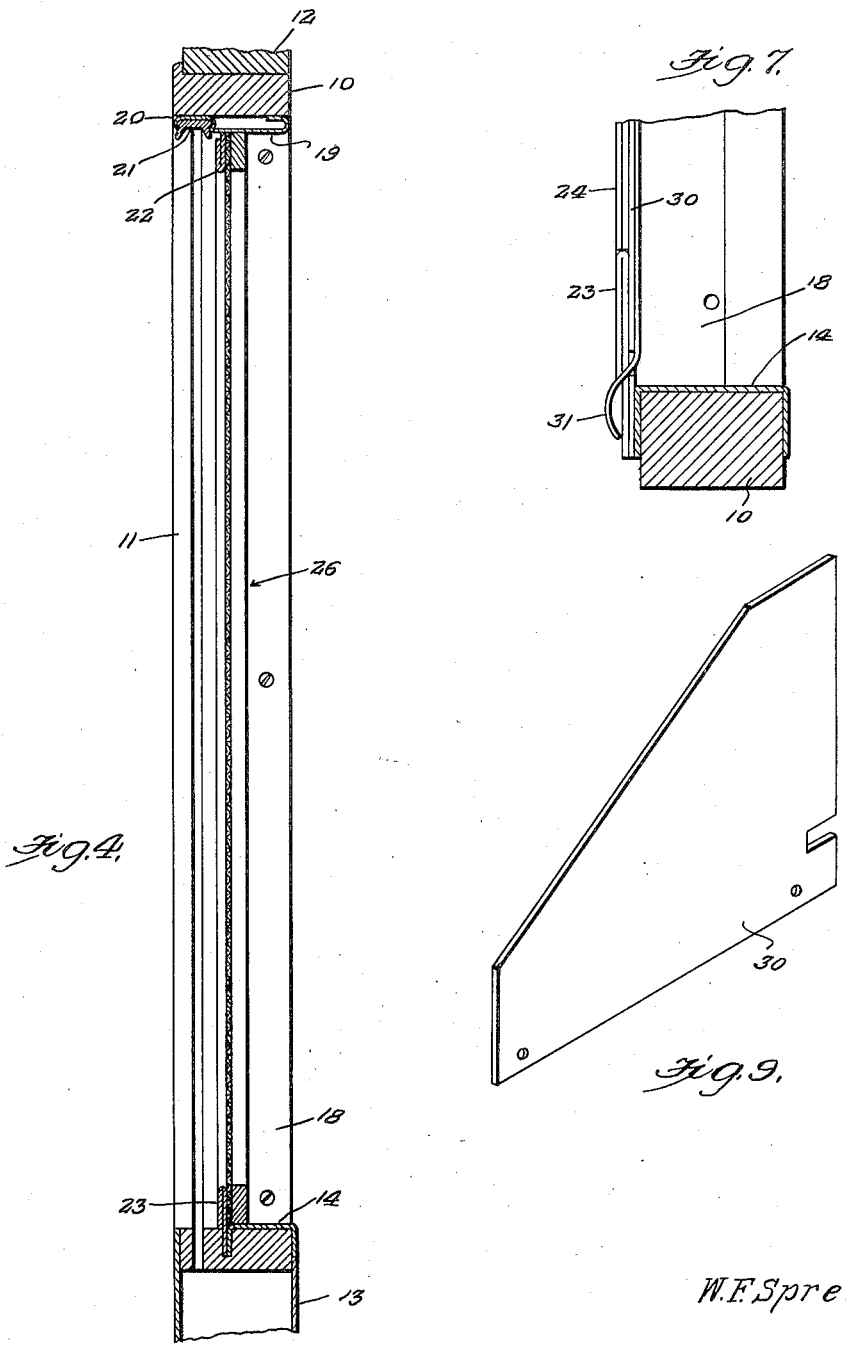
Inventor  
W. F. Spreiter,  
By Clarence A. O'Brien  
Attorney Patented Jan. 1, 1929.

1,697,092

UNITED STATES PATENT OFFICE.

WALTER F. SPREITER, OF STAPLES, MINNESOTA.

VEHICLE WINDOW SCREEN.

Application filed April 30, 1928. Serial No. 273,840.

This invention relates to improved window screens especially constructed to function as an attachment or a supplementary part of a conventional window structure, such as is employed, for example, on the two-door type of Ford automobile, (1925 model).

What I aim to do is to provide a structure of this class which can be incorporated in the usual window and frame construction, without requiring alterations of the existing details, the screen comprising a main attaching frame, and a pair of swingable screen sections.

My principal object is to generally improve upon screen structures of this class by providing one which includes an arrangement of details, cooperating to form a new composite structure which will fulfill the requirement of a structure of this class in an efficient manner.

In the drawings:

Figure 1 is a side view of a fragmentary portion of an automobile of the type referred to equipped with a window screen constructed in accordance with the present invention.

Fig. 2 is an inside elevational view on an enlarged scale, detailing the rigid and swingable screen sections.

Fig. 3 is a horizontal section through the structure seen in Fig. 2.

Fig. 4 is a vertical section through the same.

Fig. 5 is a perspective view of one corner of the portion showing the overlapping ends of the frame members of the screen structure.

Fig. 6 is a fragmentary elevational view of one corner portion of the structure.

Fig. 7 is a veiw of the same structural details seen in Fig. 6.

Fig. 8 is a perspective view of portions of complemental frame bars of the screen structure.

Fig. 9 is a perspective view of a corner plate forming a part of the structure.

Referring by numerals to the various details, and particularly to Figs. 3 and 4, it will be observed that 10 designates the window frame which, as is usual, is provided on its outer side with inwardly protruding grooved rubber portions constituting guides for the usual sliding glass pane (not shown).

In Fig. 4, 12 designates one part of the body, and 13 another part of the body.

The metal part 13 in Fig. 4, has an overhanging flange 14 provided with an upstanding hand grip 15, (see Figs. 2, and 3) and provided with an elongated slot 16 to accommodate the door latch 17. Arranged in the window frame are vertical facing or finishing members 18 of hollow form and of a cross sectional configuration shown plainly in Fig. 3. These extend up along the inner sides of the vertical members of the main frame 10, where they abut the especially designed top piece 19 (see Fig. 4).

This part 19 has its outer edge portion bent to form a channel 20 in which a suitable rubber abutment strip 21 is disposed. This abutment strip is located at the upper end of the window pane guides and constitutes a yieldable stop to limit the upward lift of the window pane.

The foregoing parts are old and well known, and the improvement comprises the screen structure which, as before indicated, is adapted to be incorporated in the window frame structure without requiring alterations of the existing parts. The screen structure comprises a metallic frame including upper and lower frame bars 22 and 23 respectively (see Fig. 4), and vertical side bars 24 and 25 (see Fig. 3).

These bars are cut from heavy sheet metal of sufficient strength to retain its shape and position, or from thin sheet metal bent upon itself as shown better in Fig. 5 and Fig. 8, for reinforcing purposes. The said frame bars are then fastened to the respective finishing members 18 at a point between the finishing member 18 and the grooved rubber glass pane guides, Fig. 3.

The filler plate 30, and the lower frame bar 23 are fastened to the finishing member 14, Fig. 4, at a point between the window pane and guides, and the finishing member 14.

The upper frame bar 22 being in place at a point abutting the rubber window pane stop 21 and the finishing member 19, the adjacent ends of the respective frame bar are overlapped as shown in Fig. 5, and suitably fastened together. The placement of this metallic screen frame, is clearly indicated in Fig. 3.

Mounted on the metallic screen frame are the screen sections 26 and 27 respectively. The frame 26 at the right is rigidly fastened to the metal screen frame, and the section 27 is hinged thereto as at 28 to permit it to be swung inwardly and when desired.

Referring to Fig. 2, it will be observed that the lower corner portion 29 of the swingable screen section 27 is cut off to provide a clearance for the door latch 17. In addition, I provide a metallic space filler plate 30 here, which is fastened to the finishing member 14.

Referring to Fig. 7, and also to Fig. 6, it will be seen that the customary anti-rattling clips 31 are allowed to protrude in the usual position through cut-out portions in the screen frame bars and filler plate 30, so that they may function properly.

Referring again to Fig. 2, it will be observed that I provide a small retaining latch 32 pivotally connected on the screen frame bar and swingable into a keeper seat 33 in the swingable section 27. Thus, it will be seen that the latch 32 can be released, and section 27 swung inwardly to permit signaling with the hand, or for any other desired reason. Also a latch 34 is provided on the right hand side of rigid section of screen to hold the swingable section open when desired (see Fig. 2).

From the foregoing description and drawings, it is obvious, that I provide a sectional screen frame, the sections being in form of metallic bars, fastened together in overlapping relation, and this metallic frame occupying a position between the customary finishing members of the usual window structure, and the main frame of the window structure.

The metallic screen frame is equipped with a retaining latch, and a pair of screen sections, and each screen section is made of a small wooden or metal frame, having suitable screen wire thereon. The swingable sections cooperate with the corner plate which operates as a space filler, and this arrangement provides for clearance, between the lower corner of the swingable screen section and the latch which is employed for opening the door.

Thus, the presence of this invention, does not interfere with the existing parts. In fact, it is so made as to cooperate with these parts, and to add to the utility of a car door window.

It is to be noted that the structure is such as to permit it to be varied to fit in window frame of different model cars. All parts are placed inside of the car window glass for greater safety and protection to the occupants of the car. The principal purpose is to prevent the entrance of flies, mosquitoes, and the insects, and also to prevent serious accidents by preventing children from falling through open windows of moving cars.

The screens also prevent serious cuts from flying chips of broken glass in case of accident. The structure is believed to be advantageous in that it promotes cleanliness and sanitation, and prevents accumulation of insects, and the like on articles of food being carried.

It permits the car to be parked with the windows left open to permit the fresh air to enter, without permitting the entrance of flies.

It is convenient that it permits safe signaling, by the hand when occasion requires such signals. These and other advantages and features of the invention have doubtless been made apparent from the description and drawings.

It is thought that a careful consideration of the description and drawings, will enable persons skilled in the art to which the invention relates, to obtain a clear understanding of the same. Therefore a more lengthy description is regarded unnecessary.

Having thus described my invention, what I claim as new is:—

An attachment for a conventional car door window construction comprising a metallic screen frame embodying top and bottom, and side members connected together, a substantially triangular plate occupying the one corner of the frame, and connected to the adjacent frame member, a pair of screen sections, each including a screen carrying frame bar, one of the screen sections being rigidly mounted on said screen frame, the remaining section being hingedly mounted on the first-named section and having a diagonally shaped lower corner portion cooperating with said triangular corner plate.

In testimony whereof I affix my signature.

WALTER F. SPREITER.